United States Patent
Sheridan et al.

(10) Patent No.: US 11,882,144 B2
(45) Date of Patent: *Jan. 23, 2024

(54) RULE-BASED ASSIGNMENT OF CRITICALITY SCORES TO ASSETS AND GENERATION OF A CRITICALITY RULES TABLE

(71) Applicant: Tenable, Inc., Columbia, MD (US)

(72) Inventors: Barry Sheridan, Dublin (IE); Vincent Gilcreest, Dublin (IE); Anthony Bettini, Lexington, MA (US); Matthew Ray Everson, Appleton, WI (US); Wei Tai, Dundrum (IE); Renaud Deraison, New York, NY (US)

(73) Assignee: TENABLE, INC., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,968

(22) Filed: Jan. 24, 2022

(65) Prior Publication Data

US 2022/0150274 A1   May 12, 2022

Related U.S. Application Data

(63) Continuation of application No. 16/171,692, filed on Oct. 26, 2018, now Pat. No. 11,258,817.

(51) Int. Cl.
*H04L 29/06* (2006.01)
*H04L 9/40* (2022.01)
*G06N 20/00* (2019.01)

(52) U.S. Cl.
CPC ......... *H04L 63/1433* (2013.01); *G06N 20/00* (2019.01); *H04L 63/02* (2013.01);
(Continued)

(58) Field of Classification Search
CPC ... H04L 63/1433; H04L 63/02; H04L 63/105; H04L 63/107; H04L 63/1408;
(Continued)

(56) References Cited

U.S. PATENT DOCUMENTS

| | | | |
|---|---|---|---|
| 8,984,643 B1 * | 3/2015 | Krisher | H04L 63/1408 726/25 |
| 10,728,085 B1 * | 7/2020 | Chen | H04L 41/0659 |

(Continued)

FOREIGN PATENT DOCUMENTS

| | | | | |
|---|---|---|---|---|
| CA | 2824627 A1 * | 8/2012 | | G06F 16/211 |
| CN | 106202854 A * | 12/2016 | | G06F 16/24522 |
| CN | 107040551 A * | 8/2017 | | H04L 63/1416 |

*Primary Examiner* — John B King
(74) *Attorney, Agent, or Firm* — Muncy, Geissler, Olds & Lowe, P.C.; Daniel Podhajny

(57) ABSTRACT

In an embodiment, a management system obtains a criticality rules table that includes a plurality of rules mapped to corresponding criticality scores indicative of a level of risk in the event that an associated asset of a managed network is compromised by a third party. The one embodiment, the criticality rules table is updated based upon machine learning and/or feedback from an operator of the managed network. In another embodiment, the criticality rules table is used to assign one or more criticality scores to one or more assets based on one or more attributes of one or more assets, and the criticality rules table.

20 Claims, 8 Drawing Sheets

(52) U.S. Cl.
CPC .......... *H04L 63/105* (2013.01); *H04L 63/107* (2013.01); *H04L 63/1408* (2013.01); *H04L 63/205* (2013.01)

(58) Field of Classification Search
CPC ....... H04L 63/205; H04L 41/28; H04L 63/20; G06N 20/00
See application file for complete search history.

(56) References Cited

U.S. PATENT DOCUMENTS

| | | | | |
|---|---|---|---|---|
| 10,771,506 | B1* | 9/2020 | Kumar | H04L 63/02 |
| 2006/0282660 | A1* | 12/2006 | Varghese | G07F 7/1083 |
| | | | | 713/155 |
| 2008/0172347 | A1* | 7/2008 | Bernoth | H04L 63/0263 |
| | | | | 726/13 |
| 2009/0125973 | A1* | 5/2009 | Byers | H04L 63/1433 |
| | | | | 726/1 |
| 2012/0143650 | A1* | 6/2012 | Crowley | G06Q 10/0635 |
| | | | | 726/25 |
| 2013/0074188 | A1* | 3/2013 | Giakouminakis | G06F 21/577 |
| | | | | 726/25 |
| 2013/0339457 | A1* | 12/2013 | Freire | G06Q 10/0635 |
| | | | | 709/204 |
| 2014/0173686 | A1* | 6/2014 | Kgil | H04L 63/205 |
| | | | | 726/1 |
| 2014/0173739 | A1* | 6/2014 | Ahuja | G06F 21/577 |
| | | | | 726/25 |
| 2015/0106265 | A1* | 4/2015 | Stubblefield | G06Q 20/4016 |
| | | | | 705/325 |
| 2015/0106867 | A1* | 4/2015 | Liang | H04L 63/1433 |
| | | | | 726/1 |
| 2016/0078231 | A1* | 3/2016 | Bach | H04L 67/55 |
| | | | | 726/25 |
| 2016/0232465 | A1* | 8/2016 | Kurtz | G06Q 10/0635 |
| 2017/0134410 | A1* | 5/2017 | Muddu | H04L 43/062 |
| 2017/0337240 | A1* | 11/2017 | Chen | G06N 5/01 |
| 2018/0048668 | A1* | 2/2018 | Gupta | H04L 63/1425 |
| 2018/0146004 | A1* | 5/2018 | Belfiore, Jr. | G06F 21/577 |
| 2019/0228315 | A1* | 7/2019 | Xu | G06F 9/453 |
| 2019/0260782 | A1* | 8/2019 | Humphrey | H04L 41/22 |
| 2020/0097662 | A1* | 3/2020 | Hufsmith | H04L 9/0643 |
| 2020/0112590 | A1* | 4/2020 | Bhatia | G06F 40/30 |
| 2023/0095415 | A1* | 3/2023 | Boyer | H04L 63/1408 |
| | | | | 726/23 |

* cited by examiner

RULE-BASED ASSIGNMENT OF CRITICALITY SCORES TO ASSETS AND GENERATION OF A CRITICALITY RULES TABLE

CROSS-REFERENCE TO RELATED APPLICATIONS

The present application is a Continuation of U.S. Non-Provisional patent application Ser. No. 16/171,692, entitled "RULE-BASED ASSIGNMENT OF CRITICALITY SCORES TO ASSETS AND GENERATION OF A CRITICALITY RULES TABLE," filed Oct. 26, 2018, the contents of which are hereby incorporated by reference in their entirety.

TECHNICAL FIELD

The various aspects and embodiments described herein generally relate to rule-based assignment of criticality scores to assets for use in a management system and generation of a criticality rules table.

BACKGROUND

With increasing threats and a constantly changing information technology (IT) landscape, security teams today can barely keep up with the pace of identifying vulnerabilities and threats and, more importantly, fixing them. Furthermore, as more and more organizations embrace virtualization, the cloud, mobile, and collaboration and communication among software development and IT operations (sometimes called "DevOps"), the fundamental concept of an asset changes and radically impacts how and when organizations and security teams need to assess vulnerabilities.

One factor to asset-specific vulnerability assessments is the relative importance or 'criticality' of an asset to a particular customer's operations. For example, a server storing sensitive trade secret information likely has a higher criticality to the customer relative to a media device (e.g., Roku, Apple TV, etc.), a primary work computer for a CEO of the customer likely has a higher criticality to the customer relative to a secondary (e.g., home or remote) computer of a low-level employee, and so on. Conventionally, assigning a criticality score to an asset is a manual and somewhat subjective process, whereby the customer (and/or external consultants) evaluate assets one-by-one and assign criticality scores accordingly. However, such a procedure is labor-intensive and expensive, and thereby is performed infrequently, such that the criticality scores are not kept up-to-date.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment is directed to a method for asset-centric management, comprising receiving, at a management system, information that characterizes one or more attributes of one or more assets in communication with a managed network, loading a criticality rules table that includes a plurality of rules, each rule mapping an individual attribute and/or a group of attributes to a corresponding criticality score, wherein each criticality score is configured to indicate a level of risk in the event that an associated asset is compromised by a third party, and assigning one or more criticality scores to the one or more assets based on (i) the one or more attributes of one or more assets, and (ii) the criticality rules table.

Another embodiment is directed to a method for asset-centric management of one or more assets of a managed network, comprising obtaining, by a management system, a criticality rules table that includes a plurality of rules, each rule mapping an individual attribute and/or a group of attributes to a corresponding criticality score, wherein each criticality score is configured to indicate a level of risk in the event that an associated asset is compromised by a third party, and updating, by the management system, the criticality rules table based upon machine learning and/or feedback from an operator of the managed network, wherein the updating adds one or more rules to the criticality rules table, removes one or more rules to the criticality rules table, and/or modifies one or more of the plurality of rules of the criticality rules table.

Another embodiment is directed to a management system for asset-centric management, comprising a memory, and at least one processor coupled to the memory and configured to receive information that characterizes one or more attributes of one or more assets in communication with a managed network, load a criticality rules table that includes a plurality of rules, each rule mapping an individual attribute and/or a group of attributes to a corresponding criticality score, wherein each criticality score is configured to indicate a level of risk in the event that an associated asset is compromised by a third party, and assign one or more criticality scores to the one or more assets based on (i) the one or more attributes of one or more assets, and (ii) the criticality rules table.

Another embodiment is directed to a management system for asset-centric management of one or more assets of a managed network, comprising a memory, and at least one processor coupled to the memory and configured to obtain a criticality rules table that includes a plurality of rules, each rule mapping an individual attribute and/or a group of attributes to a corresponding criticality score, wherein each criticality score is configured to indicate a level of risk in the event that an associated asset is compromised by a third party, and update the criticality rules table based upon machine learning and/or feedback from an operator of the managed network, wherein the updating adds one or more rules to the criticality rules table, removes one or more rules to the criticality rules table, and/or modifies one or more of the plurality of rules of the criticality rules table.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
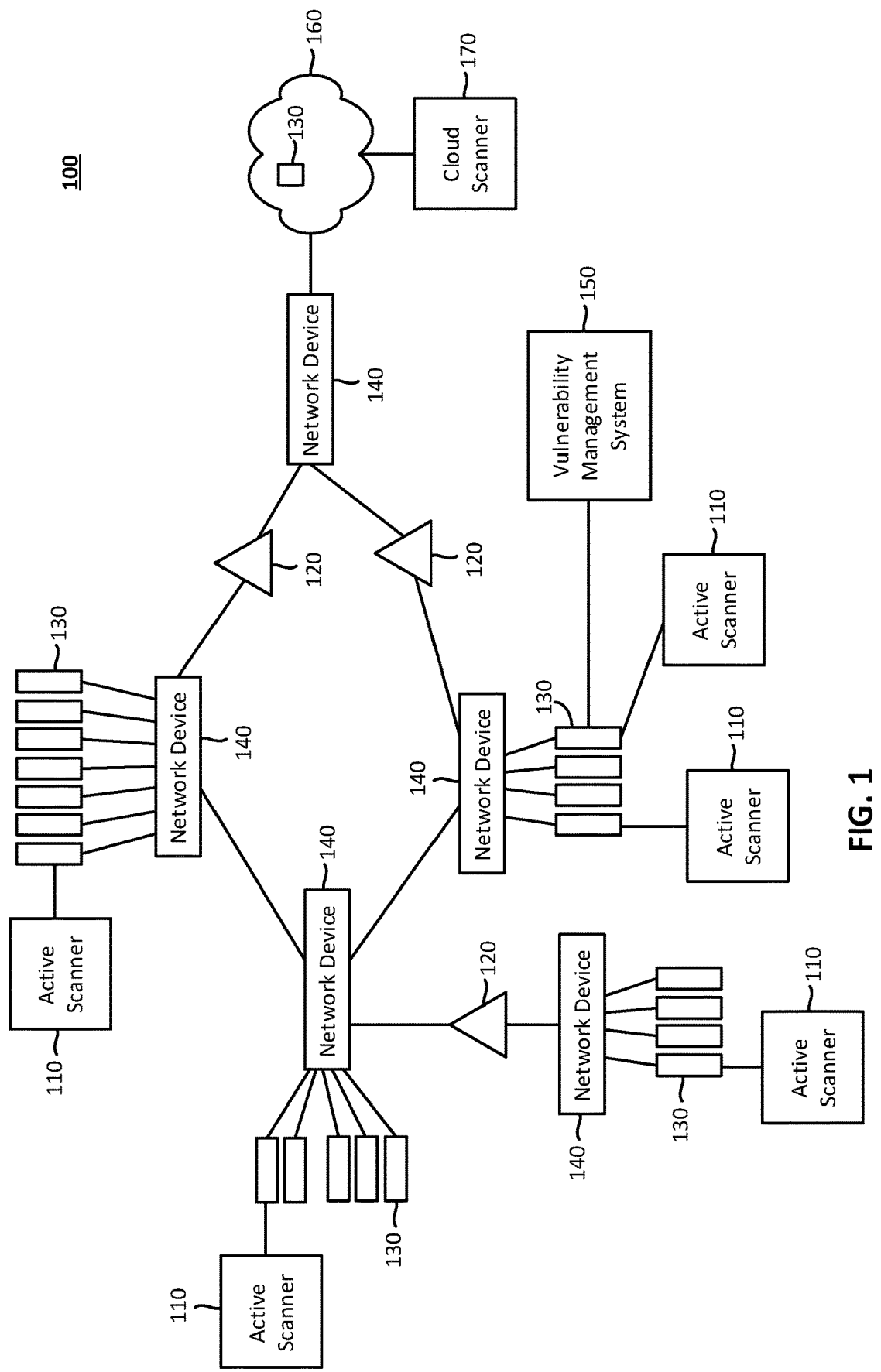
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
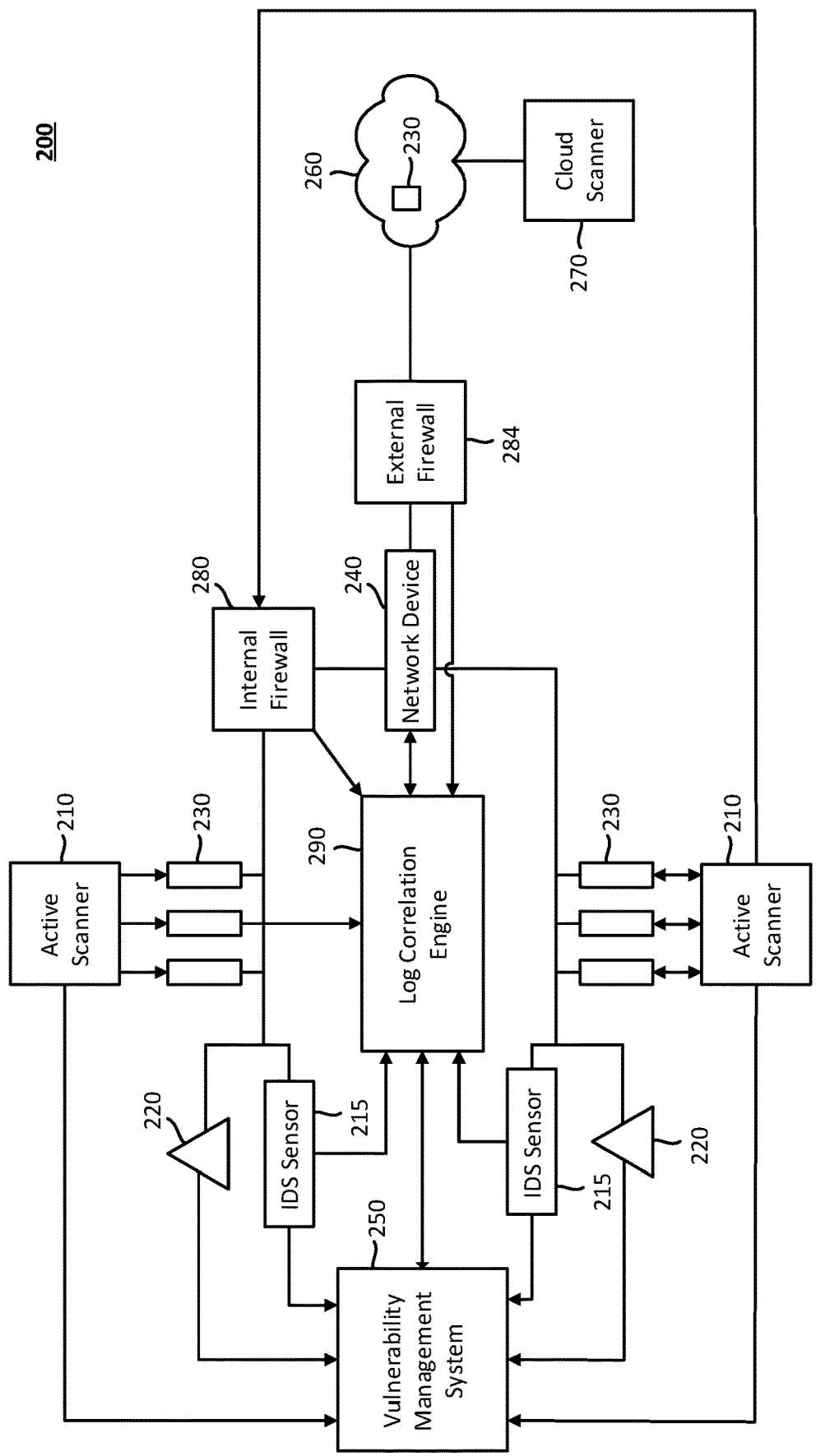
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Furthermore, as described in greater detail below with reference to FIG. 3 through FIG. 6, the vulnerability management systems 150, 250 shown in FIG. 1 and FIG. 2 may implement various algorithms or otherwise have various features and capabilities that may be used to leverage information discovered or otherwise obtained via the active scanners 110, 210, the cloud scanners 170, 270, the passive scanners 120, 220, and the log correlation engine 290 to automatically assign criticality scores to assets based on certain attributes.

Figure 3:
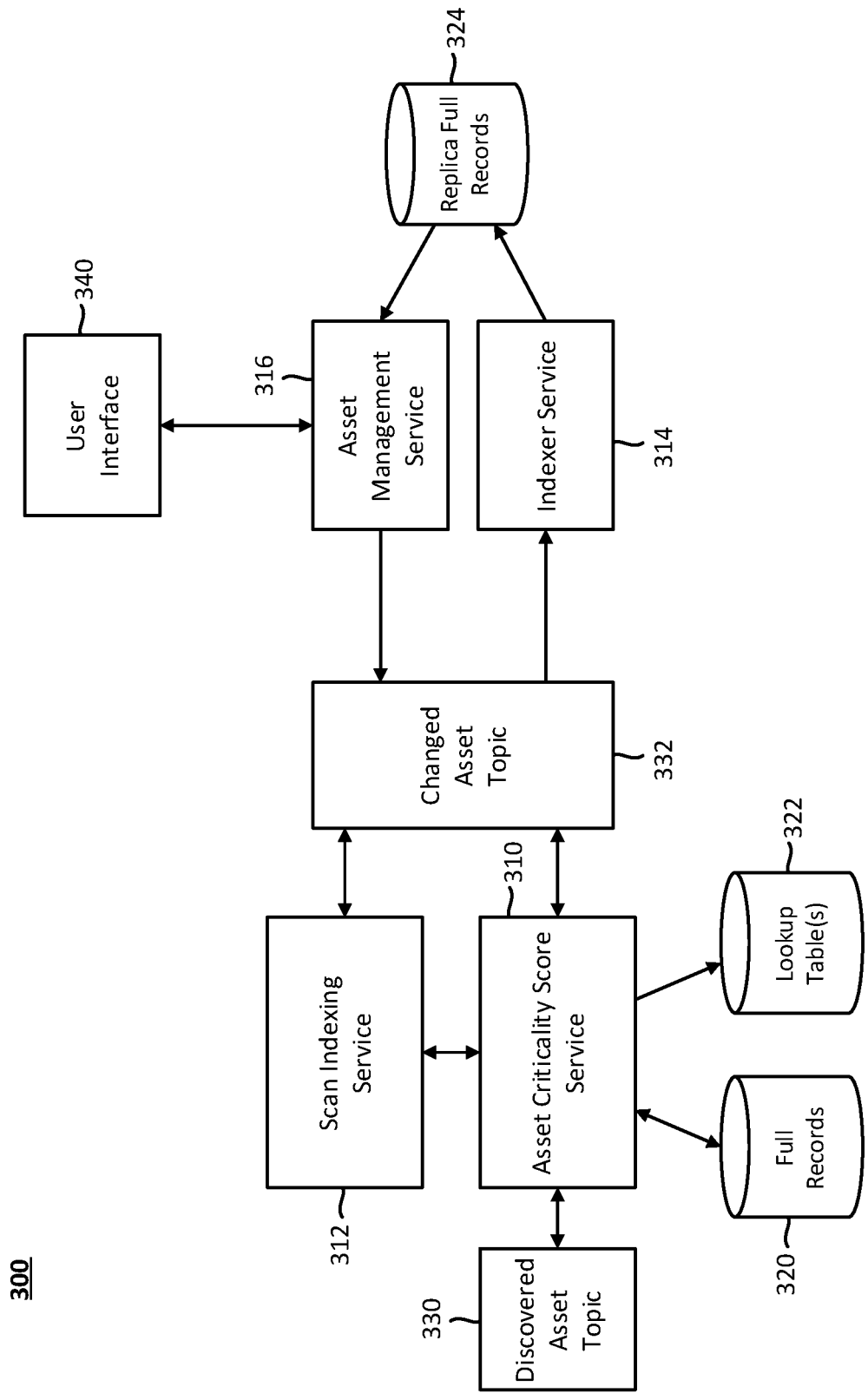
FIG. 3 illustrates an exemplary asset management service level architecture suitable for use in a vulnerability management system, according to various aspects.

According to various aspects, FIG. 3 illustrates an exemplary asset management service level architecture (SLA) 300 suitable for use in a vulnerability management system and for automatically assigning criticality scores to assets. In particular, as shown in FIG. 3, the asset management SLA 300 may include an asset criticality score service 310, which may be configured to assign criticality scores to assets based on an asset criticality score algorithm that will be described in further detail below with respect to FIG. 5. The asset criticality score service 310 may be coupled to one or more databases used to store records relating to existing assets that have been discovered in a managed network. In particular, in the example shown in FIG. 3, the asset criticality score service 310 is coupled to a full records database 320, which may be configured to store a full representation of each asset record. The asset criticality score service 310 may also be coupled to a scan indexing service 312, which may be configured to create one or more incoming scan records to index information that was obtained in one or more active scans, cloud scans, passive scans, event logs, etc. and to provide the incoming scan records to the asset criticality score service 310. As such, the full records database 320 may generally be used when the asset criticality score service 310 needs to determine whether one or more incoming records have new or updated information about a particular asset. The full records database 320 may also be used to restore a replica full records database 324 (or vice versa) in case of record loss. The replica full records database 324 is coupled to a public-facing management service 316 that responds to requests received via a user interface 340 in regards to the assets and to an indexer service 314 used to keep the replica full records database 324 up-to-date.

In various embodiments, in addition to the full records database 320, the asset criticality score service 310 may be coupled to one or more lookup databases or lookup tables 322 that store information specific to a particular "identification attribute" or other suitable lookup property. For example, the lookup table(s) 322 may be configured to map a specific identification attribute (e.g., a MAC address, a NetBIOS name, a FQDN, etc.) to a universally unique identifier (UUID) associated with an asset. As such, when an incoming record contains an identification attribute that matches an identification attribute stored in the appropriate lookup table 322, the incoming record may be matched to the asset UUID as stored in the lookup table 322. Accordingly, when the asset criticality score service 310 matches an incoming scan record to an asset UUID, a message may be published to a discovered asset topic 330. Furthermore, when one or more properties associated with an asset is newly seen or changed, a message may be published to a changed asset topic 332 to indicate the update, which may then be propagated to the scan indexing service 312 and to the replica full records database 324 via the indexer service 314. The asset criticality score service 310 may also update the properties (e.g., the criticality score) associated with the asset in the full records database 320 accordingly.

Figure 4:
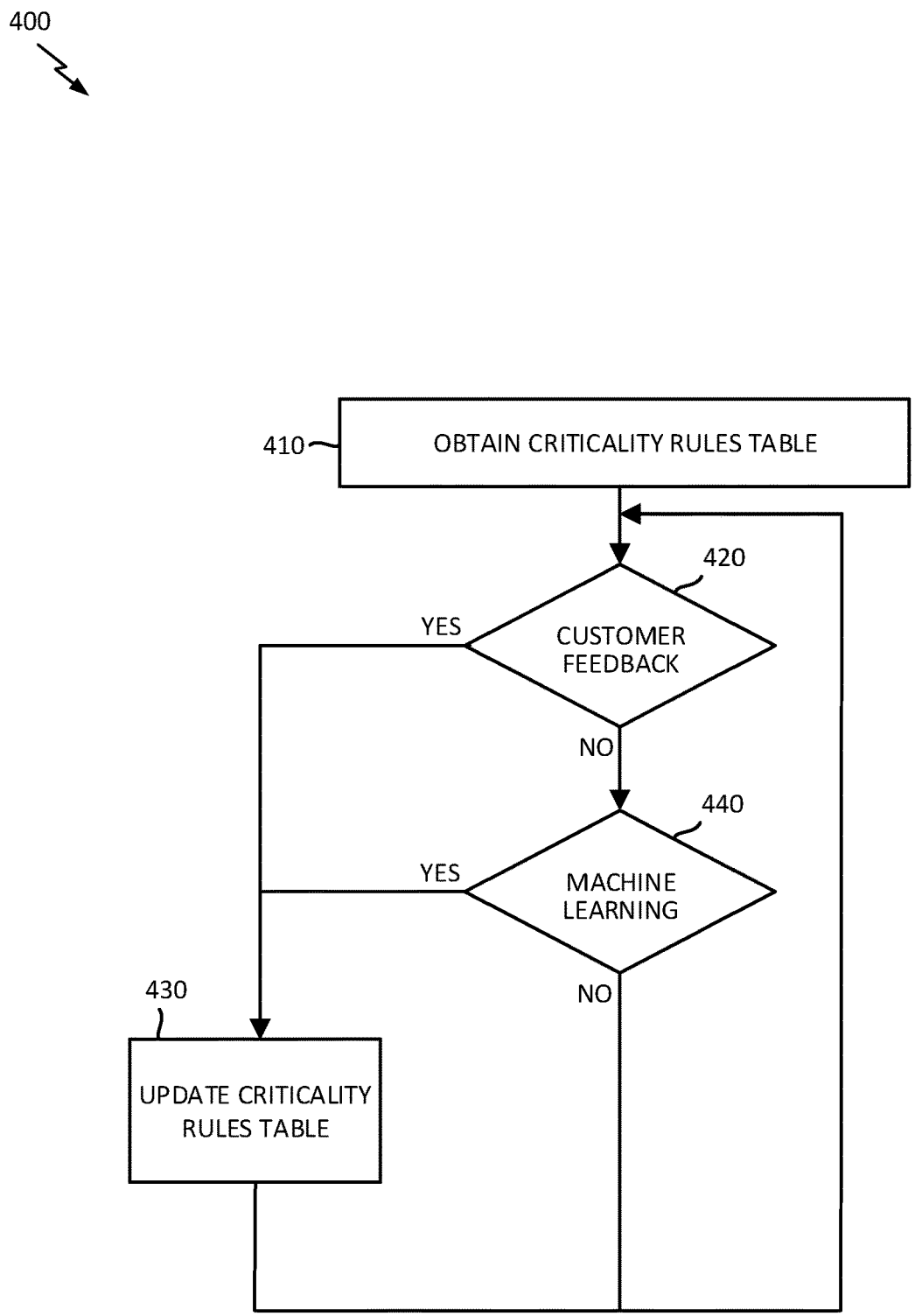
FIG. 4 illustrates an exemplary process for generating and updating a criticality rules table in accordance with an embodiment of the disclosure.

FIG. 4 illustrates an exemplary process 400 for generating and updating a criticality rules table in accordance with an embodiment of the disclosure. In an example, the process 400 of FIG. 4 may be performed by a vulnerability management system, such as the vulnerability management system 150 of FIG. 1. However, in other embodiments, the management system the implements the process 400 of FIG. 4 need not be a vulnerability management system that separately assesses and/or manages vulnerability-related aspects for a managed network.

More particularly, the process 400 shown in FIG. 4 may generally be performed as an ongoing background process at the management system. By way of example, the criticality rules table may change over time based on various types of feedback (e.g., machine-learning, customer feedback, internal customer data that is shared with the management system, etc.). As new scan records are received, the most up-to-date version of the criticality rules table may be retrieved and used for assigning and/or updating criticality score(s) for asset(s) associated with those new scan records.

Referring to FIG. 4, at 410, the management system obtains a criticality rules table that maps individual attributes and/or groups of attributes to corresponding criticality scores. As used herein, a "criticality score" is a value that is configured to indicate a level of risk in the event that an associated asset is compromised by a third party. The type of risk indicated by the criticality score may include economic risk to an operator of a managed network (e.g., exposure of trade secret information, exposure of critical information that can impact the stock price of a private company, the asset is hard to access physically so there are high costs associated with physical travel of maintenance personnel to that physical asset, etc.), safety risk (e.g., one or more people are at risk of physical danger in the event of a loss of control over that asset, such as a self-driving vehicle, an elevator control system, etc.), and so on. However, the criticality score is not indicative of a level of risk associated with how easy or hard it is to compromise the underlying itself. In other words, the criticality score is not an assessment of asset (or network) vulnerability, but rather an assessment of asset 'importance'. In one example, the criticality rules table may be an initial or default criticality rules table that is at least partially configured manually based on empirical study of a particular managed network.

In a specific example, each row of the criticality rules table may correspond to a rule whereby an individual attribute or a group of attributes (e.g., which can be detected via SQL-query statements executed on the outputs of the assets, and can be conveyed to the management system as part of a scan record for a particular asset as plugin output) is mapped to a particular criticality score. A specific example of a criticality rules table whereby criticality scores range from 1 (low risk) to 5 (high risk) is shown in Table 1, as follows:

TABLE 1

Criticality Rules Table

| Rule # | Score (0-5) | Name | Asset Attribute | Definition |
|---|---|---|---|---|
| 1 | 1 | upnp_detection | Device Capability - UPnP service | The device supports Universal Plug and Play (UPnP), primarily intended for home networks. |
| 2 | 1 | appletv_detect | Device Type - Multimedia | The remote host is a digital media receiver. |
| 3 | 1 | avocent_kvm_detect | Device Type - KVM | The remote host is an Avocent KVM over IP switch that provides for control of connected servers and devices. |
| 4 | 1 | canon_pixma_printer_www_detect | Device Type - Printer | The remote device appears to be a Canon PIXMA printer. |
| 5 | 1 | hdhomerun_discovery_service_detect | Device Type - Multimedia | A home entertainment-related service is listening on the remote host. |
| 6 | 1 | device_type_printer | Device Type - Printer | Remote device is a printer |
| 7 | 1 | svc_skype | Device Capability - VoIP | Remote host runs a skype service |
| 8 | 2 | cod_detection | Device Capability - Gaming Server | The remote host is running a Call of Duty game server. |
| 9 | 2 | os_identification_Unix_family | Device Type - General Purpose | The remote operating system in use is UNIX family |
| 10 | 2 | os_identification_Microsoft_Windows_family | Device Type - General Purpose | The remote operating system in use is Microsoft Windows. |
| 11 | 2 | os_identification_Mac_OS_X | Device Type - General Purpose | The remote operating system in use is Mac OS X. |
| 12 | 2 | os_identification_Linux_family | Device Type - General Purpose | The remote operating system in use is Linux family. |
| 13 | 2 | tcp_syn_smb | Device Capability - File Sharing | Remote host runs a SMB service. It could be a printer or a shared file server |
| 14 | 2 | svc_telnet | Device Capability - Remote Logon | Remote host runs a service enabling users to remotely log on and perform operations on the host. Such services are for example SSH or Telnet. |
| 15 | 3 | is_credentialed | N/A | Credentialed or third-party patch management checks are possible for asset (~33% of assets) |
| 16 | 3 | forticlient_detect | Device Capability - Firewall Protected | A security application for Windows is installed on the remote host. |

TABLE 1-continued

Criticality Rules Table

| Rule # | Score (0-5) | Name | Asset Attribute | Definition |
|---|---|---|---|---|
| 17 | 3 | device_type_hypervisor | Device Type - Hypervisor | The remote system type is 'hypervisor'. |
| 18 | 3 | device_type_embedded | Device Type - Embedded | The remote system type is 'embedded'. |
| 19 | 3 | os_identification_VMware_ESXi | Device Type - Hypervisor | The remote operating system in use is 'VMware ESXi'. |
| 20 | 3 | tcp_syn_ftp | Device Capability - FTP | remote host runs a ftp service |
| 21 | 3 | cpe_app_db | Device Capability - Database | The remote host runs a database server, such as SQL Server, Derby Network Server, DB2, SAP MaxDB, etc |
| 22 | 4 | comelit_camera_detect | Device Type - Surveillance and webcam | The remote host can be used to reach cameras on the remote Comelit network. |
| 23 | 4 | axis_www_detect | Device Type - Surveillance and webcam | The web interface for an AXIS device was detected on the remote host. |
| 24 | 4 | amanda_detect | Device Capability - Backup over Network | The remote host is running an AMANDA backup system client. |
| 25 | 4 | device_type_camera | Device Type - Surveillance and webcam | The remote system type is a 'camera'. |
| 26 | 4 | device_type_router | Device Type - Router | The remote system type is a 'router' such as dlink, Cisco IOS devices |
| 27 | 4 | device_type_fire_wall | Device Type - Firewall | The remote system type is a 'firewall'. A firewall can be SonicWALL, FortiOS, Cisco ASA series, |
| 28 | 4 | os_identification_Dell_PowerConnect_Switch | Device Type - Switch | The remote operating system in use is Dell_PowerConnect_Switch. |
| 29 | 4 | os_identification_Juniper | N/A | The remote operating system in use is Juniper. |
| 30 | 4 | tcp_syn_dns | Device Capability - DNS | remote host runs a dns service. The existing rule cisco_network_registrar_detect masks it |
| 31 | 4 | mail_services_detected | Device Capability - Mail service | remote host runs mail services such as SMTP |
| 32 | 4 | device_type_switch | Device Type - Switch | Remote host is a (L3) switch |
| 33 | 4 | device_type_loadbalancer | Device Type - Load Balancer | Remote host is a load balancer |
| 34 | 4 | device_type_webcam | Device Type - Surveillance and webcam | Remote host is a webcam |
| 35 | 4 | device_management_system_detected | Device Capability - Management over Network | The remote host runs a system for remote device management, such as monitoring, configuration, provisioning, backup, and so on. The managed devices can be the host itself or other devices on the network. The device management systems are, for example, fortigate firewall management console, citrix xenserver VM management interface, Belkin web administration devices, fireeye web console, F5 Big IP Management Interface, etc. |
| 36 | 5 | sap_rmi_p4 detect | Device Capability - Enterprise Management Systems | The remote device supports the SAP RMI-P4 Protocol. |

TABLE 1-continued

Criticality Rules Table

| Rule # | Score (0-5) | Name | Asset Attribute | Definition |
| --- | --- | --- | --- | --- |
| 37 | 5 | scada_schneider_electric_detect | Device Capability - Industrial control/management | The remote host has software running for industrial control and management. |
| 38 | 5 | Remote Asset | Device Location - Remote | The device is remote (e.g., outside of a network firewall) |
| 39 | 5 | sap_systems_detected | Device Capability - Enterprise Management Systems | The remote host runs an enterprise management system or is integral part of an enterprise mangement system such as SAP systems, such as SAP Host control, SAP DIAG server, SAP BusinessObject, SAP R3, SAP router server, and so on. |

In one embodiment, as reflected in Table 1 (above), the attributes factored into each rule may characterize an asset in various ways. In one example, different attribute classes may be defined, whereby some or all of the rules evaluate whether a particular asset class or set of asset classes applies to a particular asset. In one example, a first attribute class characterizes an asset in terms of location (e.g., a "local" asset that is connected to the managed network via an Intranet behind a customer-controlled internal firewall, or a "remote" asset that is connected to the managed network from a remote location). In a further example, as shown in various rules in Table 1 (above), a second attribute class characterizes an asset in terms of device type (e.g., laptop, printer, media player, general purpose, KVM, multimedia, etc.), and a third attribute class characterizes an asset in terms of device capability (e.g., based on which applications are running or installed on the asset, the type of OS installed on the asset, etc.).

For example, at least one of the plurality of rules in the criticality rules table may be based upon asset location. In a more specific example, assume that a first rule maps a first location-based attribute of being locally connected to the managed network to a first criticality score, and a second rule maps a second location-based attribute of being remotely connected to the managed network to a second criticality score. In this case, the first criticality score may be different than the second criticality score (all things being equal). In an example, whether the first criticality score is higher than the second criticality score may be based upon customer-specific feedback and/or preferences. However, multiple attributes may affect the criticality score, so this single attribute is not necessarily determinative of the relative criticality scores of such rules in all instances.

In another example, at least one of the plurality of rules is based upon device type and/or device capability. In a more specific example, assume that a first rule maps a first attribute that is characteristic of an entertainment device to a first criticality score, and a second rule maps a second attribute that is characteristic of a consumer device to a non-entertainment device to a second criticality score. As will be appreciated, the nature of the device (e.g., entertainment vs. non-entertainment use such as productivity or network-supporting functions) may be inferred from device type and/or device capability of the asset in terms of hardware characteristic(s) of the asset (e.g., the asset is an entertainment device such as an Apple TV, or a non-entertainment device such as a printer, a network switch, a network server, etc.) and/or software characteristic(s) of the asset (e.g., the asset is running entertainment software such as Netflix or a MMORPG, or is running network routing software, etc.). In this case, the second criticality score will generally be higher than the first criticality score (all things being equal). However, multiple attributes may affect the criticality score, so this single attribute is not necessarily determinative of the relative criticality scores of such rules in all instances.

Other device types and/or device capabilities that may impact criticality scores may include certain asset functionalities. For example, a capability of a local asset to access points of communication outside of the Firewall of the managed network (e.g., via phone calls, data transport sessions, etc.) may tend to increase the associated criticality score of the local asset (e.g., since the local asset could send sensitive data to non-secure entities). Other examples may include whether or not a particular asset has an RFC1918 address.

It will be appreciated that the rules depicted in Table 1 (above) as well as the more generalized rules-based approach whereby criticality scores are assigned based on attributes that classify the location, device types and/or device capabilities of the assets are provided as examples only. More broadly, any attribute with the potential to indicate a level of risk to an operator of the managed network in the event that an associated asset is compromised by a third party may be factored into one or more rules of the criticality rules table.

Referring to FIG. 4, after obtaining the criticality rules table at 410, the criticality rules table may undergo various refinements whereby (i) one or more rules are removed from the criticality rules table, (ii) one or more rules are added to the criticality rules table, (iii) one or more rules are modified in the criticality rules table (e.g., the score mapped to a particular plugin is changed, etc.). Several non-limiting examples of information that can be used to refine (or update) the criticality rules table will now be described.

Referring to FIG. 4, at 420, the management system determines whether customer feedback has been received that warrants an update to the criticality rules table. In this context, the "customer" is assumed to correspond to an operator (or owner) of the managed network.

For example, Rule #2 of Table 1 assigns an Apple TV digital media player/streamer a criticality score of 1, which implies that Apple TVs do not pose much economic risk to the customer (even if hacked). For most cases, Rule #2 is probably accurate, as Apple TVs are generally used as entertainment devices which would not entail much risk to the customer if compromised (e.g., hacked). However, if the customer itself is Apple, then some Apple TVs could actually be products under development, in which case the risk if these 'prototype' Apple TVs are hacked is much higher. Hence, customer feedback can be used to override 'default' criticality scores in some instances and/or machine-learned criticality scores (discussed below in more detail).

If the management system determines at 420 that customer feedback at 420 has been received that warrants an update to the criticality rules table, the process advances to 430 whereby one or more rules in the criticality rules table are added, deleted and/or modified based on the customer feedback. Otherwise, the process advances to 440.

Referring to FIG. 4, at 440, the management system determines whether to update the criticality rules table based on machine-learning (ML) implemented at the management system. In an example, ML-based rules can be derived using a labelled training dataset that predicts asset criticality based on input asset attribute vectors. Examples of ML-based rules are provided in Table 2, as follows:

TABLE 2

ML-based Attribute Vector Examples

| ML Feature# | Input Asset Attribute Vector | Definition |
|---|---|---|
| 1 | Enterprise systems | The remote host runs enterprise management systems or is an integral part of an enterprise system. |
| 2 | Networked storage | The remote host is or is part of a networked storage system such as NAS or SAN, etc. |
| 3 | Load balancer | The remote host is a load-balancer. |
| 4 | Industrial control and management | The remote host is for monitoring and controlling industrial processes. |
| 5 | Security Devices | The remote host is a network security device, such as firewall or security gateway, etc. |
| 6 | Management over Network | The remote host runs a system for remotely and centralized device management. |
| 7 | Database | The remote host runs a database server |
| 8 | DNS service | The remote host runs DNS service |
| 9 | Mail service | The remote host runs services for sending/receiving mail, such as SMTP |
| 10 | Remote console manager | The remote host is dedicated hardware for console management diagnose and provisioning, such as such as Dell idrac, or HP iLO, etc |
| 11 | Network access control | The remote host runs software system for access control. |
| 12 | Router | The remote host is a network router. |
| 13 | Switch | The remote host is a OSI Network Layer 2 or 3 switch, mainly operating on Intranet |
| 14 | Power management | The remote host performs power management for devices, such as UPS |
| 15 | Surveillance and webcam | The remote host is a part of a surveillance system, such as webcam, overhead camera or video server, etc |
| 16 | FTP | The remote host runs FTP service |
| 17 | Point of Sales | The remote host is a point of sale machine |
| 18 | Hypervisor | The remote host provides virtual computers to users. |
| 19 | Network performance | The remote host performs network monitoring and performance optimization. |
| 20 | Tele conference - PBX | The remote host is a part of a tele-conference system or a business telephone system |
| 21 | General purpose | The remote host is a general-purpose computing asset, such as PC, workstation, server, etc |
| 22 | Remote logon | The remote host can be remotely logged on |
| 23 | File sharing | The remote host runs SMB service |
| 24 | Gaming server | The remote host runs a game server. |
| 25 | Print server | The remote host is a print server. |
| 26 | Wireless access point | The remote host is a Wireless Accessing Point. |
| 27 | UPnP service | The remote host is be detected and configured autonomously once connected to a network. |
| 28 | KVM | The remote host is a KVM switch |
| 29 | Multimedia | The remote host is a multimedia devices, such as video or audio streaming devices, disc player, apple TV, etc. |
| 30 | Printer | The remote host is a printer |

In an example, the Input Asset Attribute Vectors shown in Table 2 (above) that are based in part upon ML may at least partially overlap with and/or be supplemental to the Asset Attributes shown in Table 1 (above). For example, ML-based Feature #30 in Table 2 may function as a supplement or refinement to Rule #6 from Table 1. In other examples, the ML-based Features from Table 2 may be used to populate at least some original rules in the rules table of Table 1, as opposed to being refinements to preexisting rules. Hence, ML can be used to both originate new rules as well as refine existing rules in certain embodiments. Actual criticality scores are not shown in Table 2 as such scores may vary from customer to customer.

If the management system determines at 430 to update the criticality rules table based on the ML of 440, the process advances to 430 whereby one or more rules in the criticality rules table are added, deleted and/or modified based on the ML. Otherwise, the process returns to 420. Hence, the refinements at 420-440 may occur as ongoing background procedures (which occur in any order) during operation of the management system, whereby new scan records obtained by the management system are evaluated based on the most up-to-date criticality rules table. Moreover, in some examples, the updates performed at 430 may trigger a new scan of the assets connected to the managed networks and/or a re-evaluation of old scan records, as the update to the criticality rules table may result in a score change for certain assets.

As will be appreciated, the process 400 of FIG. 4 provides various advantages and improvements to the management system. In particular, conventionally, assigning a criticality score to an asset is a manual and somewhat subjective process, whereby a criticality rules table is not used at all. Rather, a technician may use a configuration utility by which the technician manually assigns a particular criticality score to a particular asset (e.g., via a pulldown menu of available asset scores). By contrast, the process 400 of FIG. 4 generates a criticality rules table that is capable of automatic execution by the management system, such that assets across a managed network may be assigned criticality scores in near real-time, which dramatically decreases the time, effort and cost associated with assignment of criticality scores.

Figure 5:
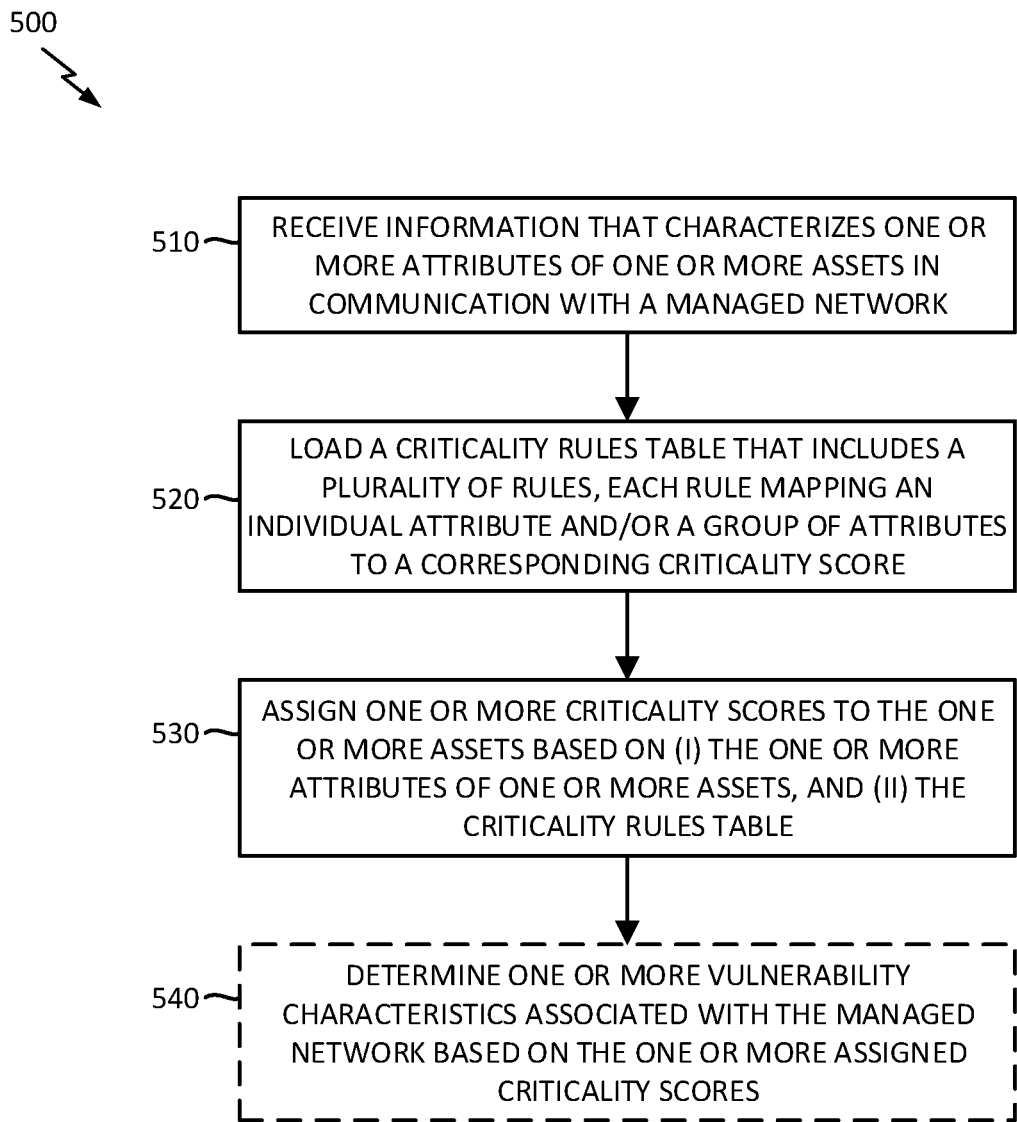
FIG. 5 illustrates an exemplary process for assigning a criticality score to an asset based on a criticality rules table in accordance with an embodiment of the disclosure.

FIG. 5 illustrates an exemplary process 500 for assigning a criticality score to an asset based on a criticality rules table in accordance with an embodiment of the disclosure. In an example, the process 500 of FIG. 5 may be performed by a management system, such as the vulnerability management system 150 of FIG. 1. However, in other embodiments, the management system the implements the process 500 of FIG. 5 need not be a vulnerability management system that separately assesses and/or manages vulnerability-related aspects for a managed network. In other words, it is possible for criticality score assignments to be implemented together with and/or separately from vulnerability-related aspects in various embodiments.

Referring to FIG. 5, at 510, the management system receives information that characterizes one or more attributes of one or more assets in communication with a managed network. The information that is received at 510 may be received (and formatted) in a variety of different ways.

Referring to 510 of FIG. 5, in one example, the information received at the vulnerability management system at 510 may be contained in a set a scan records from one or more vulnerability scanners in communication with the managed network. For example, the set of scan records may be configured to indicate whether any of the plugin outputs set forth in Table 1 (above) are applicable to a particular asset or group of assets. In various embodiments, the incoming scan records may be received from one or more active scanners, one or more cloud scanners, one or more agents that are locally installed on a given asset, one or more passive scanners configured to observe traffic in a network, one or more log correlation engines, and/or any suitable combination thereof. In various embodiments, the incoming scan records may each contain one or more identification attributes, which may be assigned an authoritative weight based on a probability that the identification attribute is unique and a probability of having multiples. Furthermore, in various embodiments, the incoming scan records may include a timestamp or other information that indicates when the scan that resulted in the record was performed, which may be referenced when determining whether to update a matching record (if any) using information contained in the incoming scan record.

Referring to 510 of FIG. 5, in another example, the information received at the management system at 510 may be received from an operator of the managed network. For example, the operator of the managed network may detect errors in the manner in which attributes for particular asset(s) are classified, and may suggest corrections (corresponding to the received information at 510) which override earlier attribute designations for those particular asset(s). Alternatively, the operator of the managed network may simply volunteer asset-specific attribute information without detecting any actual errors in how those asset-specific attribute(s) were previously classified.

Referring to 510 of FIG. 5, in another example, the information received at the management system at 510 may be received from a CMDB maintained by the operator of the managed network. For example, the operator of the managed network may maintain one or more CMDBs, which are relational databases that that store asset-related information, including hardware and software code attributes. In cases where the operator of the managed network grants the vulnerability management system access to the CMDB data (e.g., in the form of CMDB records), in some cases such data may be more accurate and/or complete than data that can be obtained via the scan records described above. Hence, the CMDB data may be used to supplement (or even override) the attribute information derived from scan records in some embodiments, which can result in a different criticality score being assigned.

Referring to 510 of FIG. 5, in another example, the information received at the management system at 510 may be received as any combination of scan records from vulnerability scanners, direct customer feedback from the operator of the managed network and/or CMDB records.

Referring to FIG. 5, at 520, the management system loads a criticality rules table that includes a plurality of rules, each rule mapping an individual attribute and/or a group of attributes to a corresponding criticality score, wherein each criticality score is configured to indicate a level of risk (e.g., economic risk to an operator of the managed network, safety risk to one or more people, etc.) in the event that an associated asset is compromised by a third party. Table 1 (above) is one representative example of how a criticality rules table may be configured. Moreover, it will be appreciated that the process 400 of FIG. 4 may be performed as a background process. In this case, 520 of FIG. 5 may be configured to load the most recent version (e.g., current or up-to-date) of the continually updated criticality rules table.

Referring to FIG. 5, at 530, the management system assigns one or more criticality scores to the one or more assets based on (i) the one or more attributes of one or more assets, and (ii) the criticality rules table. In an example, a multi-rule score calculation scheme may be used to assign a criticality score to an asset for which multiple rules are applicable or potentially applicable. The score assignment(s)

at 530 may be implemented in a variety of ways, with a few non-limiting examples being as follows:

Example multi-rule score calculation scheme #1: Assign a criticality score corresponding to a highest score for which a target asset is qualified based on the criticality rules table (e.g., if asset #1 is a digital media receiver in accordance with Rule #2 of Table 1 and also supports the SAP RMI-PR protocol in accordance with Rule #36 of Table 1, then asset #1 is assigned the higher of the two rule-based criticality scores, in this case '5');

Example multi-rule score calculation scheme #2: Assign a criticality score corresponding to an average score (e.g., an actual average, a weighted average based upon rule priority, etc.) for which a target asset is qualified based on the criticality rules table (e.g., if asset #1 is a digital media receiver in accordance with Rule #2 of Table 1 and also supports the SAP RMI-PR protocol in accordance with Rule #36 of Table 1, then asset #1 is assigned the average of the two rule-based criticality scores, in this case '3');

Example multi-rule score calculation scheme #3: Assign a criticality score based on a tiered attribute class evaluation. An example of multi-rule score calculation scheme #3 is described below with respect to FIG. 6.

As will be appreciated, there are numerous other ways in which the criticality scores may be assigned by the managed system, including rule-specific weighted averages, unique combinations of rules (or attributes) that map to criticality scores that are not directly linked to the associated rules (or attributes) in isolation (e.g., particular combinations of attributes may indicate a level of criticality that is more or less than the 'sum of the parts'), and so on.

Once the criticality scores are assigned, the management system may optionally perform any of a number of actions. For example, the management system may optionally report the assigned criticality score(s) to the operator of the managed network, which may then provide feedback and recommend adjustments to the assigned criticality score(s), which may in turn be used to refine the assigned criticality score(s). In another example, as shown at 540, the management system may optionally determine one or more vulnerability characteristics associated with the managed network based on the one or more assigned criticality scores. For example, the vulnerability of assets with high criticality scores is of more importance than the vulnerability of assets with low criticality scores. For example, the operator of the managed network may not particularly care that a third party could easily hack into a printer, since control over the printer will not expose any of the operator's business sensitive information. In an example, assets deemed to be highly critical while also (via a separate process) being designated as highly vulnerable may pose a particularly high risk to the operator of the managed network. Hence, asset criticality can be used to weight (or factor into) vulnerability scores for various assets. Once again, the asset criticality score is determined independently from a determination of asset-specific vulnerability, as any particular asset could be deemed either as highly vulnerable or as having a very low vulnerability (e.g., to external exposure, such as hacking) irrespective of its associated criticality.

As will be appreciated, the process 500 of FIG. 5 provides various advantages and improvements to the management system. In particular, conventionally, assigning a criticality score to an asset is a manual and somewhat subjective process, whereby a criticality rules table is not used at all. Rather, a technician may use a configuration utility by which the technician manually assigns a particular criticality score to a particular asset (e.g., via a pulldown menu of available asset scores). By contrast, the process 500 of FIG. 5 automatically executes a criticality rules table such that assets across a managed network may be assigned criticality scores in near real-time, which dramatically decreases the time, effort and cost associated with assignment of criticality scores.

Figure 6:
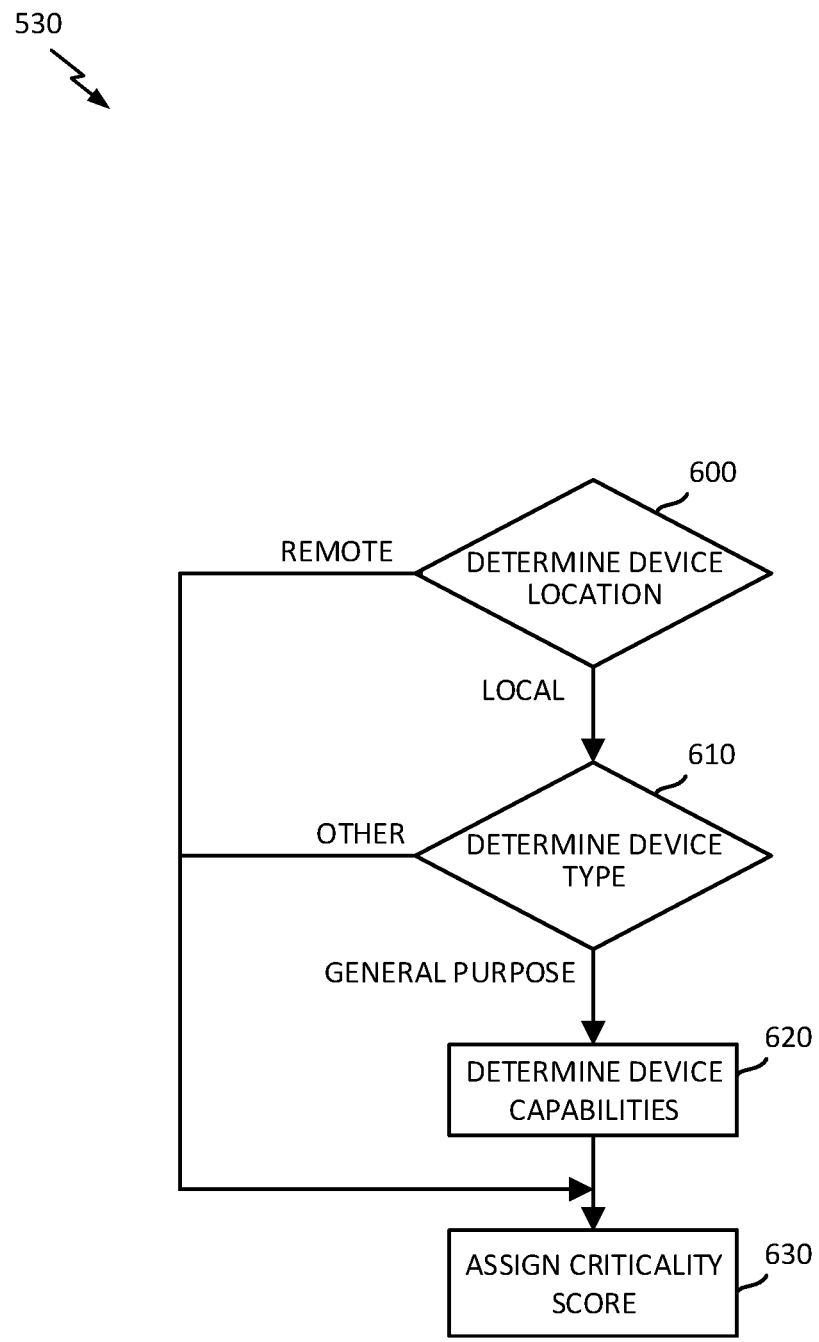
FIG. 6 illustrates an example implementation of part of the process of FIG. 5 with respect to a particular asset in accordance with an embodiment of the disclosure.

FIG. 6 illustrates an example implementation of block 530 of FIG. 5 with respect to a particular asset in accordance with an embodiment of the disclosure. In particular, the process of block 600 corresponds to an example of multi-rule score calculation scheme #3. With respect to the process of FIG. 6, the following assumptions (which may be different for other implementations of block 530 of FIG. 5) are made:

The attribute class of asset location is more relevant to criticality as compared to the attribute class of device type, and the attribute class of device type is more relevant to criticality as compared to the attribute class of device capability, Remote assets are (all other things being equal) are more highly critical than local devices, and Assets with Device Type="General Purpose" are less critical than other device types.

At 600, the management system determines a device location of an asset (e.g., local—behind a Firewall of the managed network, or remote—outside of the Firewall of the managed network). In an example, the determination of 600 may be based on the information received at 510 of FIG. 5. If the management system determines the device location of the asset to be remote at 600, then the process advances to 630 where the management system assigns a criticality score to the asset based on a rule that is used to assign criticality scores for remote assets (e.g., irrespective of device type and/or device capability). In one example, this rule (e.g., Rule #38 in Table 1) may assign the highest available criticality score (e.g., a score of 5 in Table 1) to any remote assets. Otherwise, if the management system determines the device location of the asset to be local at 600, the process advances to 610.

At 610, the management system determines a device type of the asset (e.g., based on the information received at 510 of FIG. 5). More specifically, the management system determines whether or not the device type of the asset is classified as General Purpose. If the management system determines the device type of the asset to have a priority (in terms of criticality assessments) that is less than or equal to a threshold priority (e.g., such as General Purpose) at 610, then the process advances to 630 where the management system assigns a criticality score to the asset based on an evaluation of one or more rules that assign criticality scores based on asset device type (e.g., irrespective of device capability). Examples of such rules can be found in Table 1 (e.g., Rule #2, Rule #3, etc.). In a further example, if the asset qualifies for a score assignment based on multiple rules, then multi-rule score calculation scheme #1 or multi-rule score calculation scheme #2 can be used to assign the score at 630. Otherwise, if the management system determines the device type to be of higher priority (e.g., higher priority than General Purpose) at 610, the process advances to 620. While FIG. 6 is depicted with General Purpose being the only device type being below the threshold priority, in other examples other lower priority device types may also be defined.

At 620, the management system determines one or more device capabilities of the asset (e.g., based on the information received at 510 of FIG. 5). More specifically, the device capabilit(ies) determined at FIG. 6 can be used to evaluate one or more rules (e.g., from Table 1) that are based upon the attribute class of device capability. The process then advances to 630, where the management system assigns a criticality score to the asset based on an evaluation of one or more rules that assign criticality scores based on asset device capability. Examples of such rules can be found in Table 1 (e.g., Rule #1, Rule #7, etc.). In an alternative example, rules that are not based on device capability (e.g., Rule #15 from Table 1, which is left undefined in terms of attribute class) may also be evaluated at this point. In a further example, if the asset qualifies for a score assignment based on multiple rules, then multi-rule score calculation scheme #1 or multi-rule score calculation scheme #2 can be used to assign the score at 630.

Figure 7:
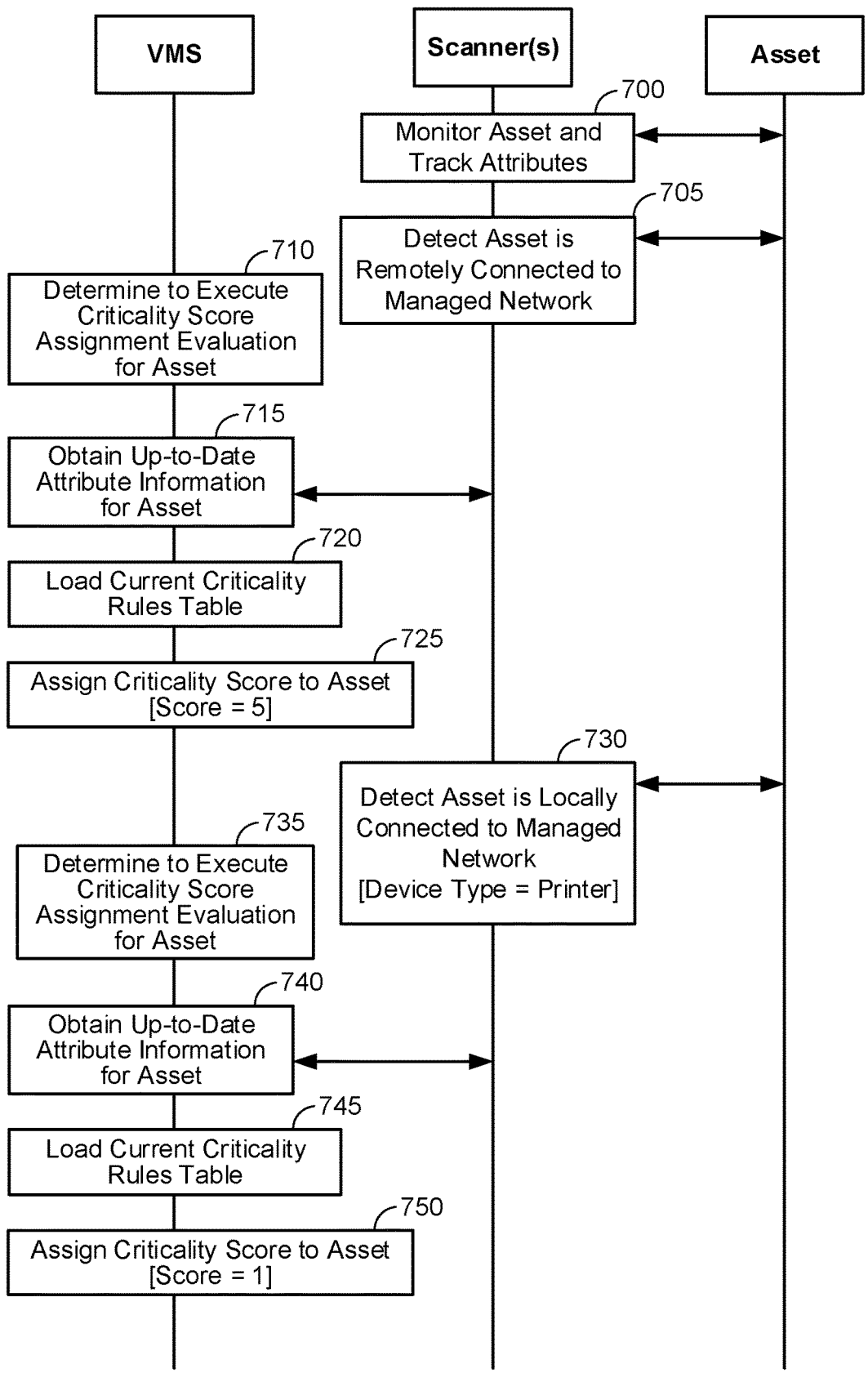
FIG. 7 illustrates an example implementation of the process of FIG. 5 in accordance with an embodiment of the disclosure.

FIG. 7 illustrates an example implementation of the process 500 of FIG. 5 in accordance with an embodiment of the disclosure. As will be appreciated, not only may the criticality rules table change over time as shown above with respect to the process 400 of FIG. 4, but the actual attributes of the assets may change as well, perhaps even more frequently. The unique combination of attributes for an asset at any given time may factor into its assigned criticality score for any particular execution of the process 500 of FIG. 5. Hence, the process of FIG. 7 demonstrates one example of how asset features may change for a particular asset (e.g., a laptop computer, etc.) over time, which in turn impacts its associated criticality score. Moreover, the example of FIG. 7 illustrates an example whereby the management system is a vulnerability management system, although as noted above this is not an express requirement for execution of the process 500 of FIG. 5.

Referring to FIG. 7, at 700, one or more scanners actively and/or passively scan an asset. As an example, the one or more scanners may include one or more active scanners, one or more cloud scanners, one or more agents that are locally installed on a given asset, one or more passive scanners configured to observe traffic in a network, one or more log correlation engines, and/or any suitable combination thereof. At 705, the vulnerability management system determines to execute a criticality score assignment evaluation for the asset. At 705, the one or more scanners detect that the asset is remotely connected to the managed network (e.g., outside of a Firewall of the managed network).

Referring to FIG. 7, at 710, the vulnerability management system determines to execute a criticality score assignment evaluation for the asset. In an example, the criticality score assignment evaluation corresponds to an instance of the process 500 of FIG. 5. In one example, the criticality score assignment evaluation for the asset may be performed as part of a network-wide criticality score assignment evaluation. For example, the network-wide criticality score assignment evaluation may be performed for all assets in a managed network either in an event-triggered (e.g., on-demand) manner or at a periodic interval (e.g., daily, weekly, etc.). The process of FIG. 7 is described with respect to a single asset simply for convenience of explanation.

Referring to FIG. 7, at 715 (e.g., as in 510 of FIG. 5), the vulnerability management system obtains up-to-date attribute information for the asset from the one or more scanners. At 720 (e.g., as in 515 of FIG. 5), the vulnerability management system loads the current criticality rules table (e.g., based on background execution of the process 400 of FIG. 4). At 725 (e.g., as in 520 of FIG. 5), the vulnerability management system assigns a criticality score to the asset based on the attribute information from 715 in combination with the criticality rules table from 720. In this example, assume that the vulnerability management system assigns the asset a criticality score of 5 based upon execution of Rule #38 from Table 1 (e.g., 600 and 630 of FIG. 6). For example, the high criticality score of 5 may be suggestive of relatively high risk in the case of the asset being compromised due to the asset being remote and thereby outside of any operator controls implemented inside of a respective Firewall of the managed network.

Referring to FIG. 7, at 730, the one or more scanners detect that the asset is now locally connected to the managed network (e.g., inside of a Firewall of the managed network).

Referring to FIG. 7, at 735, the vulnerability management system determines to execute another criticality score assignment evaluation for the asset. In one specific example, the determination of 735 can be triggered by a periodic schedule at which network-wide criticality score assignment evaluations are performed automatically, although as noted above the criticality score assignment evaluations could also be triggered via an event-triggered (e.g., security breach, in response to any change in asset information such as the detection at 730, etc.) or on-demand manner.

Referring to FIG. 7, at 740 (e.g., as in 510 of FIG. 5), the vulnerability management system obtains up-to-date attribute information for the asset from the one or more scanners. At 745 (e.g., as in 515 of FIG. 5), the vulnerability management system loads the current criticality rules table (e.g., based on background execution of the process 400 of FIG. 4). At 750 (e.g., as in 520 of FIG. 5), the vulnerability management system assigns a criticality score to the asset based on the attribute information from 740 in combination with the criticality rules table from 745. In this example, assume that the device type of the asset is a printer, such that the vulnerability management system assigns a criticality score of 1 based upon Rule #6 from Table 1. In context with FIG. 6, this would mean that block 600 results in a local determination, then block 610 results in an 'other' determination, after which the process advances 630 and evaluates rules based on device type, at which point the asset is found to satisfy Rule #6 such that the criticality score of 1 is assigned to the asset.

Figure 8:
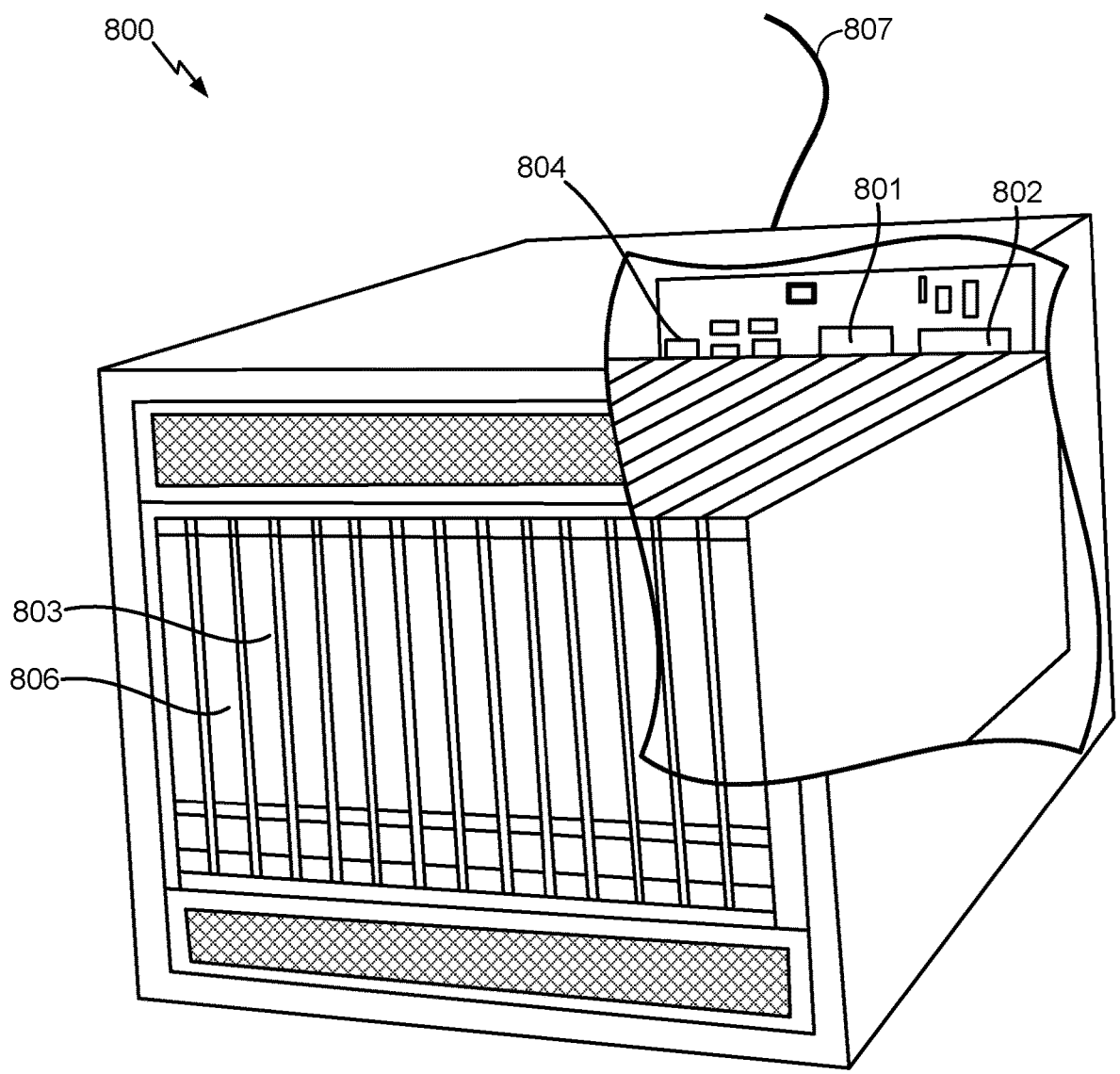
FIG. 8 illustrates a server in accordance with an embodiment of the disclosure.

The various embodiments may be implemented on any of a variety of commercially available server devices, such as server 800 illustrated in FIG. 8. In an example, the server 800 may correspond to one example configuration of a server included as part of the vulnerability management system 150 of FIG. 1 or the vulnerability management system 250 of FIG. 2. In FIG. 8, the server 800 includes a processor 801 coupled to volatile memory 802 and a large capacity nonvolatile memory, such as a disk drive 803. The server 800 may also include a floppy disc drive, compact disc (CD) or DVD disc drive 806 coupled to the processor 801. The server 800 may also include network access ports 804 coupled to the processor 801 for establishing data connections with a network 807, such as a local area network coupled to other broadcast system computers and servers or to the Internet.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for asset-centric management, comprising:
   receiving, at a management system, information that characterizes one or more attributes of one or more assets in communication with a managed network;
   loading a criticality rules table that includes at least two rules, each of the at least two rules mapping at least one attribute of the one or more attributes to a corresponding criticality score, wherein the corresponding criticality scores each represent an importance of an asset to the managed network;
   updating the criticality rules table based on one or more predicted criticality scores that are generated by machine learning; and
   assigning one or more criticality scores to the one or more assets based on (i) the one or more attributes of one or more assets, and (ii) the criticality rules table,
   wherein the assigning for a given asset includes:
      determining that the given asset is local with respect to a firewall of the managed network,
      determining a given priority of a device type of the given asset,
   wherein, when the given priority is above a threshold priority, a first criticality score is assigned to the given asset in accordance with a first rule based on the device type, and
   wherein, when the given priority is not above the threshold priority, the assigning assigns a second criticality score to the given asset in accordance with a second rule based on one or more device capabilities of the given asset.

2. The method of claim 1, wherein the assigning for another given asset includes:
   determining that the another given asset is remote with respect to the firewall of the managed network; and
   in response to the determination, assigning a third criticality score to the another given asset in accordance with a third rule of the at least two rules, the third rule mapping at least one attribute of remotely located assets to the third criticality score.

3. The method of claim 1,
wherein the information is contained in a set a scan records from one or more scanners in communication with the managed network, or
wherein the information is received from an operator of the managed network, or
wherein the information is received from a configuration management database (CMDB) maintained by the operator of the managed network, or any combination thereof.

4. The method of claim 1,
wherein the one or more predicted criticality scores are based on asset attribute vectors.

5. The method of claim 1, wherein a particular rule of the at least two rules maps a location-based attribute of being remotely connected to the managed network to a particular criticality score.

6. The method of claim 1, further comprising:
repeating the receiving, the loading, and the assigning to selectively update the assignments of the one or more criticality scores based on changes to the criticality rules table and/or based on changes to the one or more attributes.

7. The method of claim 1,
wherein a first subset of the at least two rules is manually configured by an operator of the management system,
wherein a second subset of the at least two rules is based at least in part upon feedback from the operator of the managed network,
wherein a third subset of the at least two rules is based at least in part upon one or more machine-learning refinements, or
any combination thereof.

8. The method of claim 1,
wherein multiple rules are associated with at least two particular attributes of a particular asset, and
wherein the assigning assigns a criticality score to the particular asset based on a multi-rule score calculation scheme.

9. The method of claim 8,
wherein the multi-rule score calculation scheme assigns a highest criticality score associated of the multiple rules, or
wherein the multi-rule score calculation scheme assigns an average or weighted average of criticality scores of the multiple rules, or
wherein the multi-rule score calculation scheme assigns a given criticality score in accordance with a tiered evaluation of the multiple rules based on their associated attribute classes.

10. The method of claim 8,
wherein the machine learning originates at least one rule of the at least two rules, and
wherein the machine learning refines at least one rule of the at least two rules.

11. A management system for asset-centric management, comprising:
a memory; and
at least one processor coupled to the memory and configured to:
receive, at a management system, information that characterizes one or more attributes of one or more assets in communication with a managed network;
load a criticality rules table that includes at least two rules, each of the at least two rules mapping at least one attribute of the one or more attributes to a corresponding criticality score,
wherein the corresponding criticality scores each represent an importance of an asset to the managed network;
update the criticality rules table based on one or more predicted criticality scores that are generated by machine learning; and
assign one or more criticality scores to the one or more assets based on (i) the one or more attributes of one or more assets, and (ii) the criticality rules table,
wherein the assigning for a given asset includes:
determining that the given asset is local with respect to a firewall of the managed network,
determining a given priority of a device type of the given asset,
wherein, when the given priority is above a threshold priority, a first criticality score is assigned to the given asset in accordance with a first rule based on the device type, and
wherein, when the given priority is not above the threshold priority, the assigning assigns a second criticality score to the given asset in accordance with a second rule based on one or more device capabilities of the given asset.

12. The system of claim 11,
wherein the information is contained in a set a scan records from one or more scanners in communication with the managed network, or
wherein the information is received from an operator of the managed network, or
wherein the information is received from a configuration management database (CMDB) maintained by the operator of the managed network, or
any combination thereof.

13. The system of claim 11,
wherein the one or more predicted criticality scores are based on asset attribute vectors.

14. The system of claim 11, wherein a particular rule of the at least two rules maps a location-based attribute of being remotely connected to the managed network to a particular criticality score.

15. The system of claim 11, further comprising:
repeating the receiving, the loading, and the assigning to selectively update the assignments of the one or more criticality scores based on changes to the criticality rules table and/or based on changes to the one or more attributes.

16. The system of claim 11,
wherein a first subset of the at least two rules is manually configured by an operator of the management system,
wherein a second subset of the at least two rules is based at least in part upon feedback from the operator of the managed network,
wherein a third subset of the at least two rules is based at least in part upon one or more machine-learning refinements, or
any combination thereof.

17. The system of claim 11,
wherein multiple rules of the at least two rules are associated with at least two particular attributes of a particular asset, and
wherein the assigning assigns a criticality score to the particular asset based on a multi-rule score calculation scheme.

18. The system of claim 17,
wherein the multi-rule score calculation scheme assigns a highest criticality score associated of the multiple rules, or wherein the multi-rule score calculation scheme assigns an average or weighted average of criticality scores of the multiple rules, or wherein the multi-rule score calculation scheme assigns a given criticality score in accordance with a tiered evaluation of the multiple rules based on their associated attribute classes.

19. The system of claim 11, wherein the machine learning originates at least one rule of the at least two rules, and wherein the machine learning refines at least one rule of the at least two rules.

20. A non-transitory computer-readable medium storing computer-executable instructions that, when executed by a management system, cause the management system to:

receive, at the management system, information that characterizes one or more attributes of one or more assets in communication with a managed network;

load a criticality rules table that includes at least two rules, each of the at least two rules mapping at least one attribute of the one or more attributes to a corresponding criticality score, wherein the corresponding criticality scores each represent an importance of an asset to the managed network;

update the criticality rules table based on one or more predicted criticality scores that are generated by machine learning; and assign one or more criticality scores to the one or more assets based on (i) the one or more attributes of one or more assets, and (ii) the criticality rules table, wherein the assigning for a given asset includes:

determining that the given asset is local with respect to a firewall of the managed network, determining a given priority of a device type of the given asset, wherein, when the given priority is above a threshold priority, a first criticality score is assigned to the given asset in accordance with a first rule based on the device type, and wherein, when the given priority is not above the threshold priority, the assigning assigns a second criticality score to the given asset in accordance with a second rule based on one or more device capabilities of the given asset.

* * * * *